United States Patent [19]

Wong et al.

[11] 4,455,074
[45] Jun. 19, 1984

[54] AUTOMATIC FILM REWINDING CAMERA

[75] Inventors: Wan C. Wong, North Point, Hong Kong; Shigeru Oshima, Tokyo, Japan

[73] Assignee: W. Haking Enterprises Limited, Hong Kong

[21] Appl. No.: 477,770

[22] Filed: Mar. 22, 1983

[51] Int. Cl.³ .............................................. G03B 1/12
[52] U.S. Cl. .................................... 354/173.1; 354/214
[58] Field of Search ................. 354/173.1, 173.11, 214

[56] References Cited

U.S. PATENT DOCUMENTS 4,362,370 12/1982 Iwata et al. .................... 354/173.11

Primary Examiner—Michael L. Gellner
Attorney, Agent, or Firm—Wallenstein, Wagner, Hattis, Strampel & Aubel

[57] ABSTRACT

A still camera of the type wherein film is prewound onto a takeup spool within the camera body and thereafter advanced toward and into the film cassette as successive exposures are made includes a final rewind mechanism to prevent the exposed film leader from being positioned in the camera's imaging area. A pair of switches, arranged in series, actuate an electric motor to effect final rewind when sufficient film has been advanced from the takeup spool. One of the switches is actuated responsive to the presence of tensed film on the takeup spool, while the remaining switch is actuated responsive to the presence of film in the camera's imaging area.

10 Claims, 19 Drawing Figures

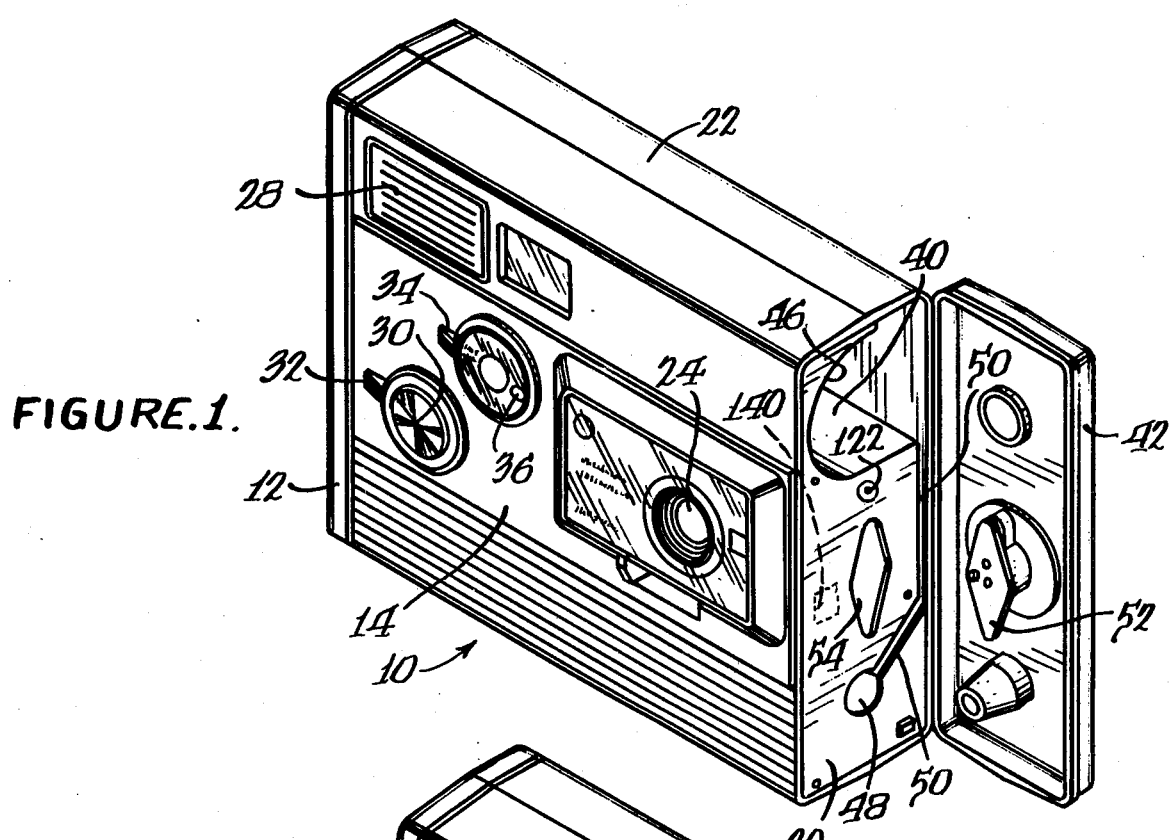
FIGURE 1.
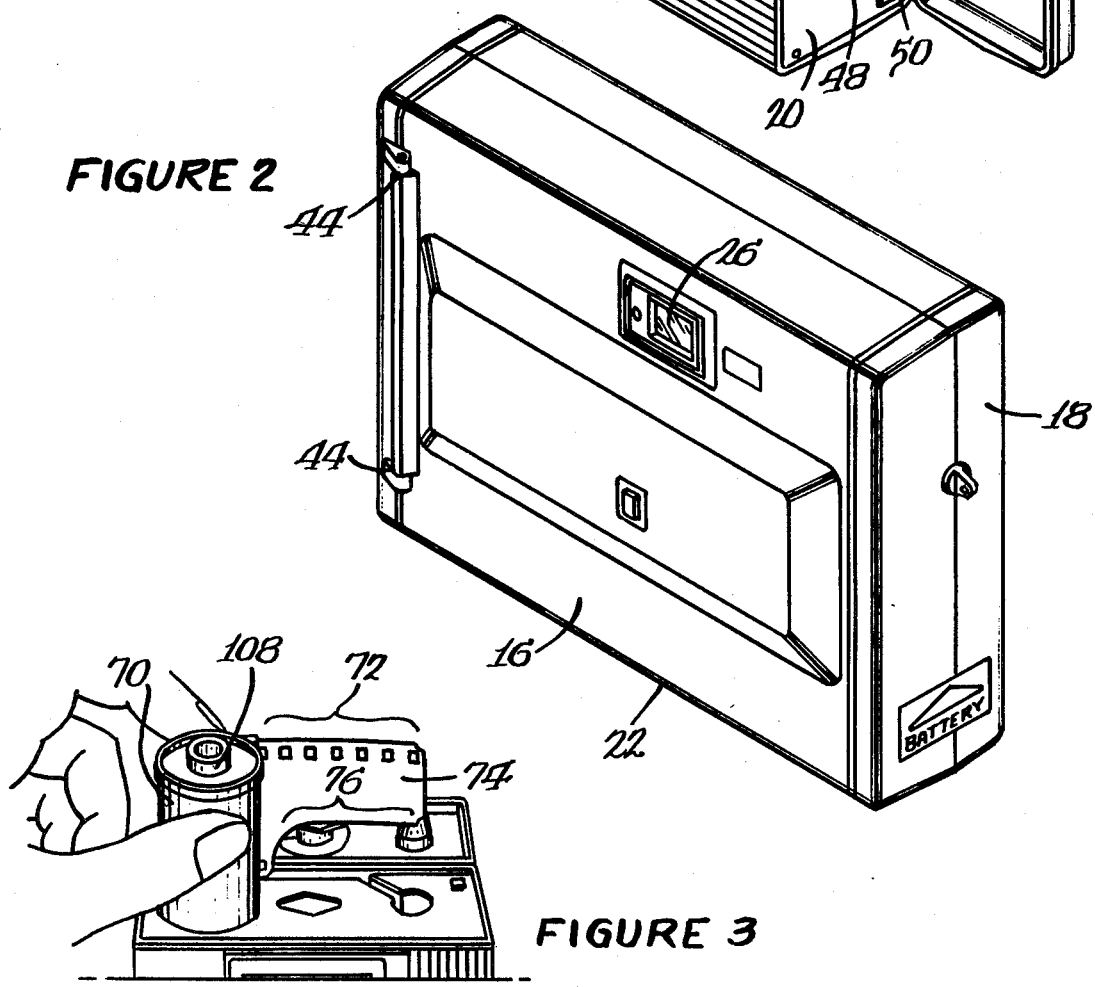
FIGURE 2
FIGURE 3

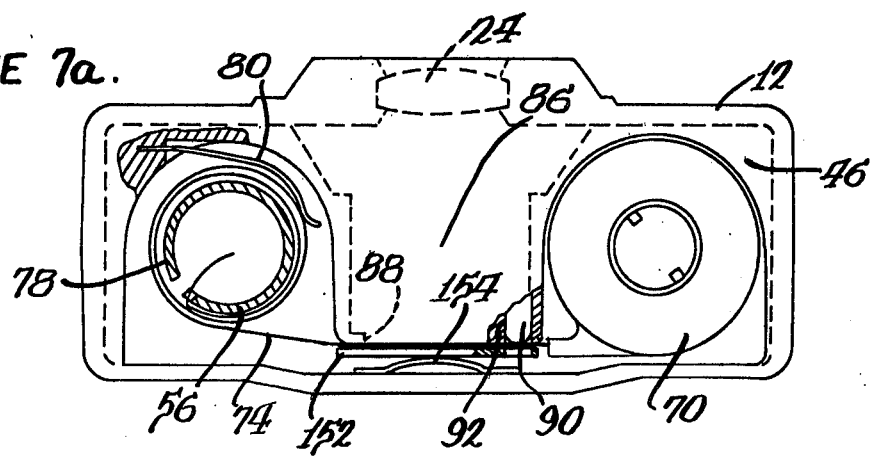
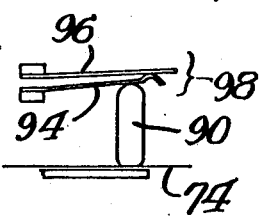
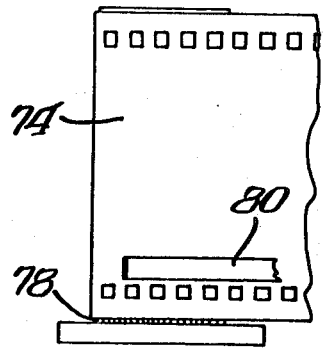
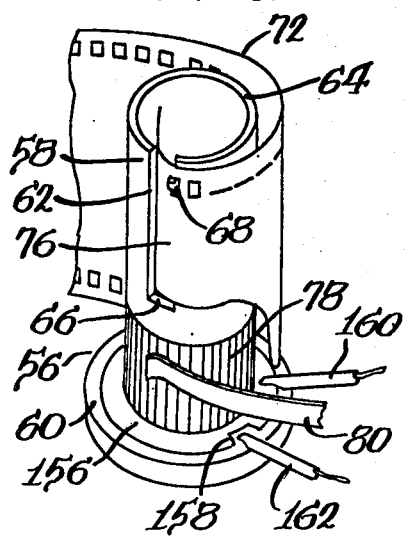
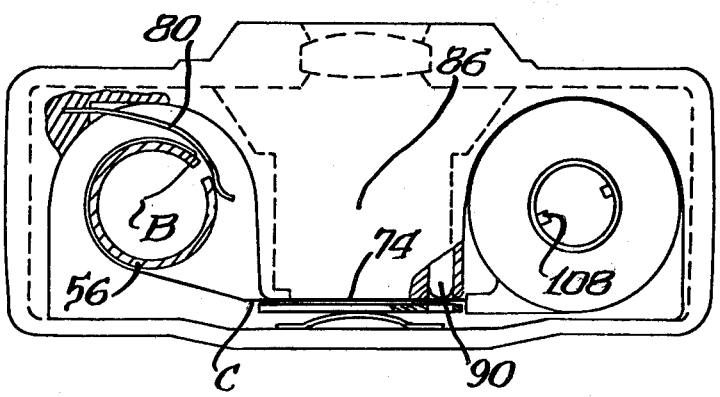
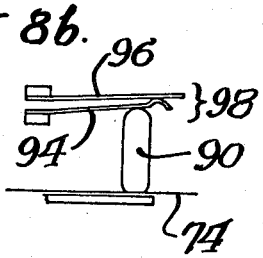
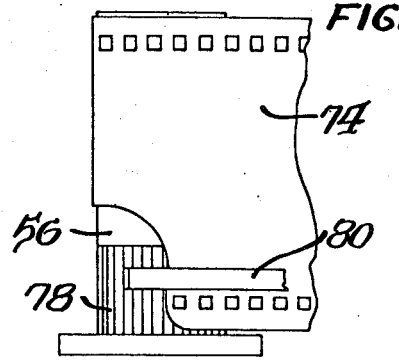

AUTOMATIC FILM REWINDING CAMERA

BACKGROUND OF THE INVENTION

This invention relates generally to still cameras, and more particularly to cameras utilizing 35 mm film or the like having a film threading tongue which extends from a cassette, and provided with motor driven film advancing means which, upon loading the camera with film, automatically prewinds the film onto a takeup spool and, after each exposure has been made, advances the film back into the film cassette one frame length at a time.

The 35 mm film format had its genesis in the early days of motion picture production, when still cameras were designed to make exposures on 35 mm movie film so that set lighting and camera exposure could be accurately checked. This format was substantially smaller in size than those commonly in use at that time, and as its popularity increased, a great number of cameras were designed to accommodate the 35 mm format.

Today, 35 mm photographic film is most commonly provided in pre-manufactured and pre-loaded film cassettes. The cassettes are light-tight and have a relatively short length of film or "leader", extending therefrom to enable the film to be engaged with a take-up spool rotatably mounted in a film-receiving chamber on the interior of the camera. This leader is fully exposed, and is not usable for the taking of pictures. Along each edge of the film, a series of regularly spaced sprocket holes are formed, reminiscent of the days when the film was intended to be run through a motion picture camera. Today, the sprocket holes are used to engage portions of the internal working mechanism of the camera in order to advance the film from the cassette, as needed. Commonly, a first portion of the leader extending from the cassette is trimmed such that a narrowed "tongue" is formed. It is this tongue that is engaged to the take-up spool within the camera.

In a typical 35 mm format camera, a film advance lever is connected by a clutch mechanism to the take-up spool. Each time the film advance lever is operated, the shutter is cocked and a take-up spool is rotated and a fresh, unexposed portion, or "frame", of film is brought into position at the imaging area of the camera, i.e., that portion of the camera to which light is directed through the lens when the camera's shutter mechanism is operated. The exposed film is thus progressively wound onto the camera's take-up spool.

When the supply of film has been exhausted, the take-up spool clutch is disengaged, and a rewind lever is used to rotate the spindle within the film cassette in order to draw the exposed film back into the cassette where it will be protected from incident light. Thereafter, the camera may be opened and the film cassette removed for processing.

It is well known in the photographic art to provide motorized film transport systems which automatically advance the film after each successive exposure has been made. This does away with the necessity to operate a film advance lever after each picture-taking operation, but still requires that the film be rewound into the cassette once the roll of film has been completed. Some such cameras utilize a motorized rewind system where the film is wound back into the cassette once the roll has been completed. This, however, does not provide protection for the film in the event that the camera is opened before the exposed film has been wound back into the cassette.

It is also known within the photographic art to provide cameras with mechanisms enabling the film within a film cassette to be completely "prewound" onto the camera's take-up spindle prior to the taking of exposures. Thereafter, when an exposure is taken, the film is advanced toward the cassette, i.e., rewound into the cassette. In this manner, exposed frames are protected within the cassette. Film frame counters in such cameras driven by film movement in both pre-wind and rewind directions indicate on a counter dial the remaining unexposed frames on the film. Should the camera become accidently or inadvertently opened, the incident light would thus not reach the exposed frames already wound into the cassette, but only the unexposed film segments left on the take-up spool, and any exposed frames or portions of frames found intermediate the imaging area and the cassette.

Another problem created when film is advanced into the cassette rather than from the cassette stems from the fact that the leader has already been exposed, and any attempt to use this portion of the film to take a photograph will be unsuccessful. We are unaware that others have attended to or considered this problem. Therefore, it is desirable that no portion of the film leader is inadvertently positioned within the imaging area during a picture taking operation, giving the photographer who forgets to observe the film counter dial the impression that there is an unexposed film segment in imaging position when, in fact, the film segment has already been wholly or partially exposed and thus incapable of recording a complete image. Such a system must also take into account the fact that 35 mm film is typically sold in varied lengths, and, more importantly, in lengths which are not integral numbers of frame lengths and so a count down film counter dial can stop at a point giving a confusing between frame count, so that the user will not know whether he has one or no frames left for picture taking.

Such a system must also take into account the fact that film cassettes are available which may be bulk loaded by the photographer, which means that the photographer may himself load unexposed film into individual cassettes. Such loading techniques may provide for more or fewer exposures than typically commercially available in pre-loaded cassettes. Commercially pre-loaded cassettes are typically available in 12, 20, 24, and 36 exposure cassettes, and the photographer who loads his own cassettes may include any number of exposures up to the maximum length of film which may be accommodated by the film cassette.

SUMMARY OF THE INVENTION

The present invention will be illustrated in a drop-loaded type still camera provided with a film chamber having a first cavity to accommodate a film cassette dropped therein in a direction parallel to the film plane, a second cavity housing a takeup spool permanently associated with the camera and spaced from the first cavity a short distance about equal to or greater than the extending length of a typical film leader, and a leader-receiving slot between these cavities.

Positioned within the camera body is a drive motor which, in a prewind mode of the camera's operation, is coupled to drive the takeup spool and, in a rewind mode of operation, is coupled to advance an unexposed film segment into the imaging area each time the camera's shutter mechanism is operated. The film cassette with which the camera is intended to be used typically has a film leader extending therefrom, and this leader passes into a slot in the takeup spool when the cassette is inserted into the first cavity and the film leader is placed in the film leader slot along the film path and into the second cavity.

A door is provided to light-tightly close off the film chamber, and when the door is closed and locked into position, the motor is actuated in its first prewind mode of operation to rotate the takeup spool to prewind the film in the film cassette fully onto the takeup spool, while leaving the tail end of the film secured to a spool mounted within the cassette. At the end of the prewind operation, film tension responsive means or manual means which places the camera in a rewind mode where after each picture-taking operation, the motor is coupled to the cassette spool and momentarily energized, advance as unexposed film segment into the imaging area and an exposed film segment into the cassette. This requires a very short motor energizing pulsation. Although herein specifically described with respect to a motor-driven prewinding system, it should be noted that the present invention also finds application for use in cameras where other methods of prewinding (e.g., manual prewinding) are used.

In accordance with the invention, means are provided to automatically move the last exposed picture-containing film segment just behind the film leader into the cassette and to alert the user of this fact to prevent the user from taking a picture which cannot be recorded on the film. In accordance with a specific aspect of the invention, this means includes a pair of film position operated switches connected in series with one another and with the film drive motor.

One of these switches, end-of-film switch, closes when the film leader is the last winding of the film left on the takeup spool, and the other switch, the end of rewind switch, is closed when there is some tension in the film causes by the pressure plate of the camera, opposite the imaging area and is opened as the leader passes by the pressure plate. The period between the closure of the end-of-film switch and the opening of the end-of-rewind switch is a number of seconds so that the sound of the long motor energization alerts the user the film is fully exposed.

In accordance with a more specific aspect of the invention, the end-of-film switch includes a contact plate which extends about the periphery of the takeup spool, and a contact arm fastened at one end to the camera, and biased so that the other end continuously engages with the contact plate. When film is wound at least partway onto the takeup spool, it is interposed between the contact plate and the contact arm, thus holding the end-of-film switch open. At this point, when the proper steps for loading the camera have been followed, the segment of the film in the imaging area of the camera is a completely unexposed segment of the film just behind the film leader.

The end-of-rewind switch preferably includes an actuating pin slidably mounted within the camera and projecting into the film path to be responsive to the presence of film in the imaging area. A film pressure plate keeps tension in the film until it passes by the pressure plate and this tension of the film against the actuating pin holds the end-of-rewind switch closed.

Thus, when no film is in the camera, the end-of-film switch is closed and the end-of-rewind switch is open.

When film is loaded into the camera and is partway wound onto the takeup spool, the end-of-film switch is open and the end-of-rewind switch is closed.

When all but the film leader is unwound from the takeup spool at a last picture is taken, the motor becomes energized to drive the cassette spool. As the leader winding slips by said contact arm, the end-of-film switch closes. Both switches are thus closed to sustain motor energization to advance the remaining film, including most or all of the pre-exposed leader, into the cassette. The motor stops when the film leader passes by the pressure plate when there is no longer film tension required to hold the actuating pin in a switch closing position. The camera is then ready to be unloaded and reloaded.

The position at which the contact arm re-engages the contact plate is selected to ensure that when this re-engagement occurs, the length of film beyond the imaging area, that is the film segment still on the takeup spool and the film segment extending therefrom to the imaging area equals or exceeds the length of pre-exposed leader, so that the last picture taken could not include any part of the film leader.

BRIEF DESCRIPTION OF THE DRAWINGS

These and further aspects of the present invention will best be understood by referring to the accompanying drawings, wherein:

FIG. 1 is a front perspective view of a still camera utilizing the present invention;

FIG. 2 is a perspective view of the rear panel of the camera shown in FIG. 1;

FIG. 3 is a partial perspective view illustrating insertion of the film cassette into the film chamber;

FIG. 6 is a perspective view of the takeup spool and end-of-film switch;

FIG. 7a is a view along line A—A of FIG. 1, showing the camera with film prewound onto the takeup spool;

FIG. 7b is a schematic view of the end-of-rewind switch as shown in FIG. 7a;

FIG. 7c is a partial elevational view of the end-of-film switch as shown in FIG. 7a;

FIG. 8a is a view along line A—A of FIG. 1, showing the camera at the initial stage of final rewinding;

FIG. 8b is a schematic view of the end-of-rewind switch as shown in FIG. 8a;

FIG. 8c is a partial elevational view of the end-of-film switch as shown in FIG. 8a;

FIG. 9b is a schematic view of the end-of-rewind switch as shown in FIG. 9a;

FIG. 9c is a partial elevational view of the end-of-film switch as shown in FIG. 9a;

FIG. 10b is a schematic view of the end-of-rewind switch as shown in FIG. 10a;

FIG. 10c is a partial elevational view of the end-of-film switch as shown in FIG. 10a.

DETAILED DESCRIPTION OF THE INVENTION

Figure 5:
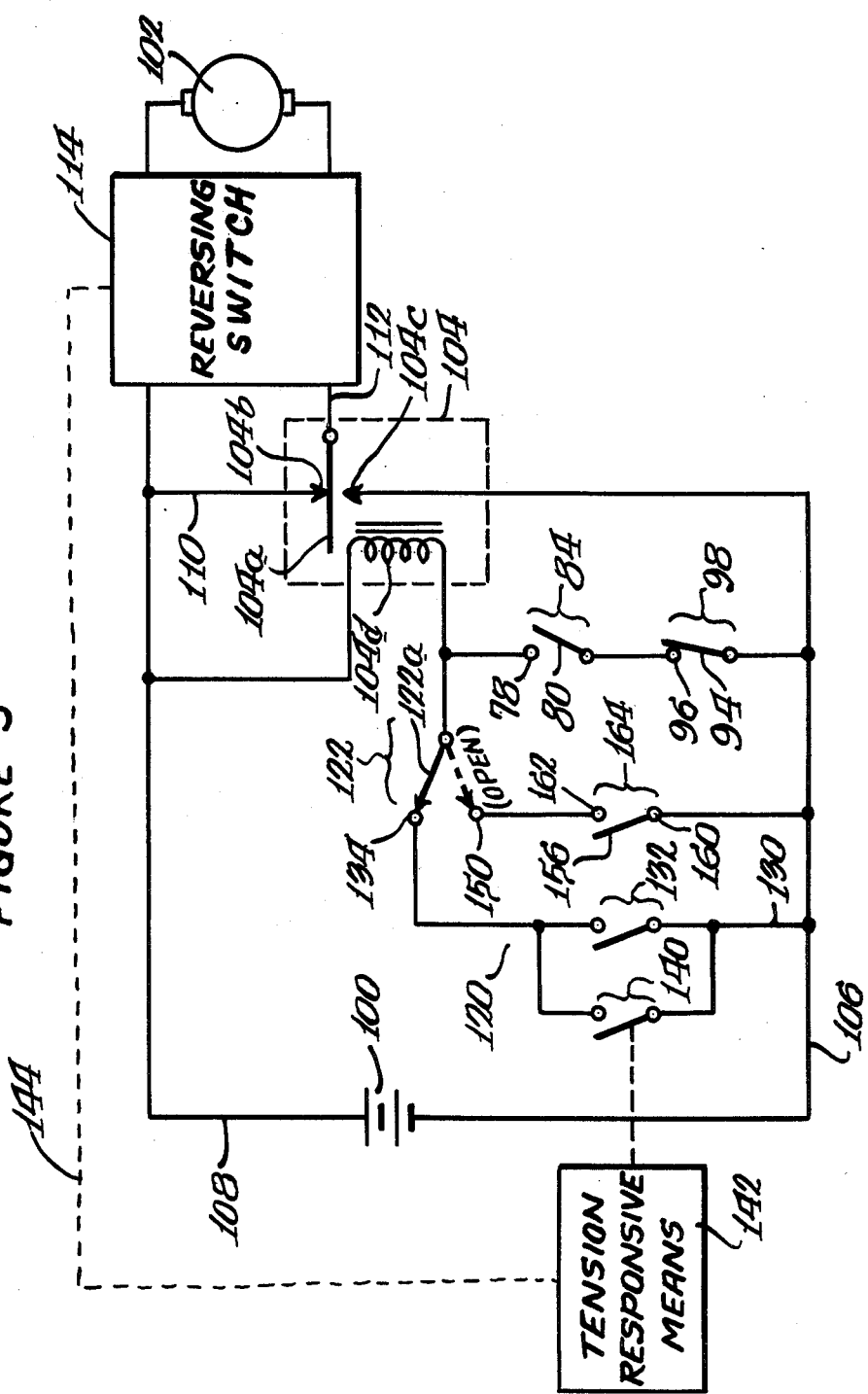
FIG. 5 is a schematic drawing of a preferred motor actuation circuit with the camera loaded with film and ready to make an exposure.

Referring now to FIGS. 1 and 2, the numeral 10 indicates generally a still camera utilizing 35 mm film as conventionally packaged in film cassettes. FIG. 1 is a front perspective view of camera 10, while FIG. 2 is a rear perspective view thereof. As herein shown, camera 10 includes a housing 12 having a front surface 14, and a rear surface 16, opposite side surfaces 18 and 20, and top and bottom surfaces 22. Camera 10 includes many features that are commonly now found on existing 35 mm cameras, and which will now be generally described.

Camera 10 incorporates an object lens assembly 24, a view finder eyepiece 26, and a built-in electronic flash element 28. Positioned behind lens assembly 24 is a shutter assembly (not herein specifically shown) which is operable by depressing shutter release button 30. Mode selector switch 32 enables a user of camera 10 to select normal, continuous, or self-timing modes of operation. Film speed setting lever 34 allows the camera to be set for the ASA or ISO rating of the film being used, and film speed window 36 indicates the speed of film that has been selected.

Figure 4:
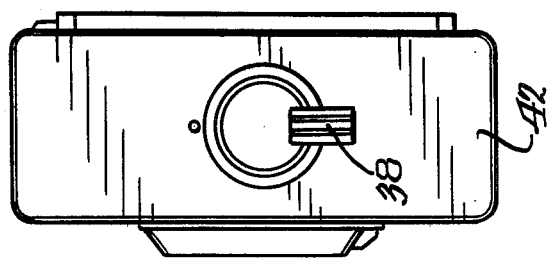
FIG. 4 is a side view of a the camera shown in FIG. 1.

The film chamber 40 is located along one side 20 of the camera housing 12 and is enclosed by a film chamber door 42 which is hinged to the housing by hinges 44 along one vertical edge thereof. The film chamber 40 incorporates a first cavity 46 to receive a film cassette, and a second cavity 48 which houses a takeup spool 56 to be described hereinbelow. First and second cavities 46 and 48 are interconnected by an elongated channel 50 to form a film path. Door 42 is held in a locked position by a latching member 52 which is received into an opening 54 in end 20 of housing 14. The latching mechanism 52 is moved between open and closed positions a lever or knob 38, shown in FIG. 4, mounted to the outside of door 42, and switche 122, to be described hereinbelow, is operated upon door closure and door latching.

Referring now to FIG. 3, the numeral 70 indicates generally a typical cassette within which 35 mm film is commonly and commercially provided. Typically, cassette 70 has a film segment or "leader" 72 extending therefrom to facilitate engaging film 74 with the camera's takeup and film advance mechanisms. Leader 72 is shown in a commonly commercially available form with a portion of the film width trimmed away to form a "tongue" 76. Because leader 72 extends outward from light-tight cassette 70, leader 72 is fully exposed and cannot be used to take photographs. It may, however, be withdrawn by hand from cassette 70 or pushed back into cassette 70 in order to facilitate the loading of camera 10. The farther it is withdrawn, the more film is exposed and, therefore, wasted.

In FIG. 3, the loading of cassette 70 into camera 10 is also illustrated. When door 42 is opened, a film leader-receiving slot 62 in takeup spool 56 must be aligned with channel 50. This could be done manually, but is preferably effected automatically upon the opening of door 42, in the manner disclosed in my copending application entitled "Automatic Slot Positioning Device for Camera Take-Up Spool", mentioned hereinabove and incorporated herein by reference. Leader 72 is either withdrawn from or wound back into cassette 70 until an appropriate length extends therefrom and, engages thereby, the takeup spool of camera 10 when cassette 70 is inserted into cavity 46 and leader 72 is inserted along channel 50. As seen in FIG. 6, a perspective view of takeup spool 56 is shown with leader 72 engaged thereto.

As seen in FIG. 6, takeup spool 56 has a cylindrically upstanding barrel portion 58 mounted to a flattened annular flange base 60. An axially extending leader-receiving slot 62 extends from the uppermost surface 64 of takeup spool 56 and terminates at slot bottom 66. A takeup hook or prong 68 is positioned along slot 62 and extends into slot 62 at a site which will enable hook 68 to engage one of the sprocket holes formed throughout the entire length of film 74.

As shown in FIG. 6, a preferred embodiment of takeup spool 56 includes slot 62 formed in a length sufficient to engage tongue 76 of leader 72. Another aspect of the present invention involves extending slot 62 to a length sufficient to engage the full width of film 74 which may not have a trimmed tongue 76.

Figure 10A:
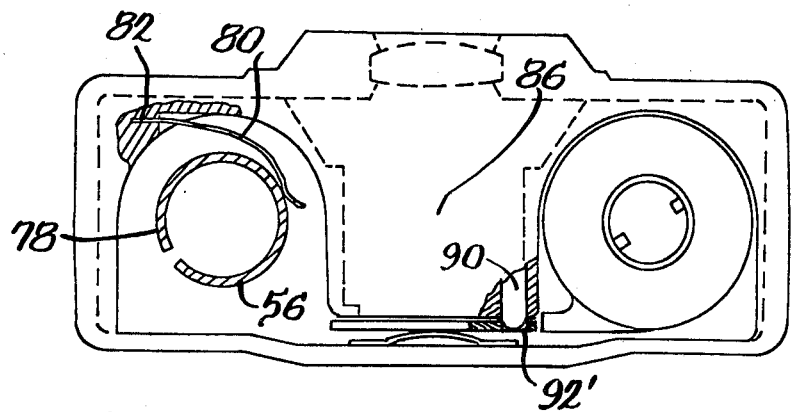
FIG. 10a is a view along line A—A of FIG. 1 showing the camera after completion of rewinding.
Figure 10B:
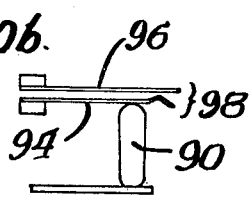
Figure 10C:
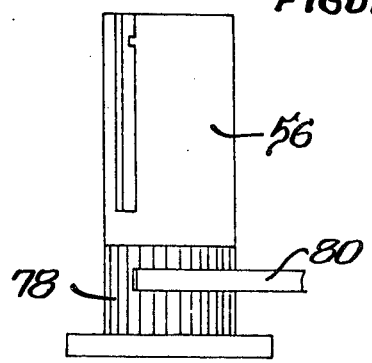

At the lowermost portion of takeup spool 56, a scrub ring 78, formed of electrically conductive material, extends about the entire outer periphery of takeup spool 56. As best seen in FIGS. 6, 10a, and 10c, contact arm 80, formed of resilient, electrically conductive material, is attached at one end 82 to camera housing 12 and is resiliently urged into contact with scrub ring 78. This contact is maintained at whatever attitude of rotation takeup spool 56 reaches. Electrically conductive means are provided to extend from scrub ring 78 and from contact arm 80 which allow the contact of contact arm 80 with scrub ring 78 to close an electrical circuit whose purpose and function are to be described herein below.

As best seen in FIGS. 6, 7a, and 7b, when sufficient film 74 has been wound onto takeup spool 56, film 74 will be interposed between scrub ring 78 and contact arm 80 thus preventing contact and breaking the electrically conductive path formed when scrub ring 78 and contact arm 80 touch one another. This point is reached when only initially unexposed film is opposite the imaging area 86 (i.e. when the entire extended film leader is past the imaging area). Thus, scrub ring 78 and contact arm 80 form an electrical switch 84, the re-closing of which during rewind occurs after the last picture is taken on the film, because, as will appear, the initiation of a rewind operation after the taking of such a last picture will cause closure of switch 84 to initiate rewind of the last picture exposed area into the cassette. The final rewind after the last picture lasts a number of seconds as compared to what occurs during a short single frame advancement. The user can hear this prolonged rewind and be alerted that he can take no more pictures.

Referring now to FIG. 7a, the imaging area 86 of camera 10 is shown as that portion of housing 12 via which light gathered by object lens 24 is directed to film 74 at film plane 88 when shutter release 30 is depressed to activate the cameras shutter mechanism. A pressure plate 152 is urged by spring 154 toward the film plane and against the film to maintain film tension and to keep the film in the desired exposure film plane. The pressure plate can be mounted for retraction when door 42 is opened in the manner disclosed in our copending application entitled "Still Camera with Pressure-Plate Control Device". As seen in FIG. 7a, an actuating pin 90 which is not contacted by the pressure plate is slidably received at one end of imaging area 86 proximate the first cavity 46 and, thereby, the film cassette 70. Actuating pin 90 protrudes from a pin slot 92 a sufficient distance to be contacted by film 74 when film 74 occupies the film path heretofore described.

As seen in FIG. 7b, actuating pin 90, when urged inwardly by tension of the film maintained by engagement of the film by the takeup spool hook 68, contacts a switch leg 94 and pushes it into resilient contact with a switch leg 96. Switch leg 94 is formed of a resilient, electrically conductive material, such that when film 74 is no longer under tension, switch leg 94 will move to an unstressed position away from switch leg 96 to thereby interrupt the electrically conductive path formed when switch legs 94 and 96 are touching, and to force actuating pin 90 outward. Thus, switch legs 94 and 96 form a second electrically conductive end-of-rewind switch 98 which is either open or closed responsive to the absence or presence of tensed film 74 in the imaging area portion of the film path of camera 10. FIG. 10b illustrates the open condition of end-of-rewind switch 98 when film 74 is not present or tensed in channel 50 of the film path of camera 10. A slot, aperture, or cavity 92' may be formed in pressure plate 152 to allow actuating pin 90 a sufficient outward travel in order to open switch 98 when no film is present in imaging area 86 of camera 10.

Spool 56 has an annular conductor 156 supported on one surface of base flange 60. Conductor 156 has an interrupted portion 158. A first contact 160 is mounted in the housing so as to be in continuous engagement with the conductor at a point radially inwardly of the interruption 160 and forms part of a circuit that will be described later. A second contact 162 is in circumferential alignment with the interruption and also forms part of a circuit that will be described hereinbelow. The circuit for automatically aligning the slot 62 with the film path is part of the circuit which drives the film during other camera operations.

Referring now to FIG. 5, a schematic drawing is there shown which, according to a preferred aspect of the present invention, allows camera 10 to prewind film 74 from cassette 70 onto takeup spool 56 and, to thereafter advance film 74 back toward and into film cassette 70 one frame at a time as camera 10 is operated to take successive film exposures.

A DC battery source 100, such as one or more AA batteries, is utilized to provide operating electrical power to the system. Motor 102 provides the motive force to transport film 74 to accomplish the various operations of camera 10.

As seen in FIG. 5, switches 84 and 98 are arranged in series, and are identified, respectively, as the end-of-film switch and the end-of-rewind switch. Arranged in parallel with switches 84 and 98 through a door switch 122 is film transport switch 132 which incorporates therein a timing device not herein specifically illustrated, but which, responsive to the operation of shutter release 30, closes only for a period to advance film 74 through imaging area 86 to position a fresh, unexposed frame of film at imaging area 86 after an exposure has been made. Such switches are well known. It could comprise a sprocket wheel not shown in the drawings with sprocket teeth which engage the film perforations and drive a rotatable contact forming part of switch 132. This contact has a slot which is engaged by a fixed wiper which reaches the slot to open the switch when the film is advanced one frame length. The depression of the shutter release 30 opens the shutter and effects a momentary bridging of the contact slot to effect initiation of motor energization and rotation of the takeup spool stops when the wiper once again reaches the slot in the rotatable contact referred to. The resulting advancement of the sprocket wheel advances the film counter and can also effect cocking of the shutter, if desired. The closing of film transport switch 132, or, the closing of both end-of-film switch 84 and end-of-rewind switch 98 can energize the coil 104d of a relay assembly 104 to complete a conductive path from battery 100 to motor 102 under the circumstances to be described.

Battery 100 is connected to coil 104d through leads 106 and 108 and these or other contacts top be described. Lead 108 is also connected through a reversing switch 114 to drive motor 102. The relay has a movable pole 104a movable between stationary contacts 104b and 104c. Conductor 110 connects lead 108 to contact 104b and lead 106 is connected to contact 104c. The movable pole 104a is connected to reversing switch 114 through a lead 112.

As illustrated in FIG. 5, the circuit incorporates a film transport circuit 120 including the door switch 122' shown as a single pole two-position switch. When door 42 is opened, switch 122 is biased to the position illustrated by the dashed lines in FIG. 5 where the movable pole 122a thereof is in contact with stationary contact 150. When the door 42 is closed, the pole 122a is in the solid line position illustrated in FIG. 5 where it contacts stationary contact 134. When the door is opened and pole 122a engages contact 150, a slot alignment switch 164 having the construction shown in FIG. 6 becomes operative to control the motor 102. Switch 164 includes an annular condition 150 rotatable with the take-up spool 70, and riding on conductor 150 is a wiper contact 160. Conductor 156 has an interruption at 158 into which wiper contact 160 falls when takeup spool slot 62 is aligned with channel 50. Thus, when door 42 is opened, the motor 102 will be energized to drive takeup spool 70 until slot 62 is in alignment with channel 50, to enable film loading.

The film transport circuit includes a lead 130 connecting the normally open film transport switch 132, which is in parallel with a film tension end-of-prewind latching switch 140. This parallel switch circuit is connected to stationary contact 134 of door switch 122 contacted by pole 122a when door 42 is closed. The closing of switch 132 is controlled by the operation of shutter release button 30 as previously described so that the switch 132 is closed whenever the shutter has operated to automatically advance the film to the next film frame by driving the cassette spool during the rewind mode of film transport. The switch 140 is latched closed to initiate a pre-wind operation which drives the take-up spool when the film chamber door is latched closed after a new film cartridge is loaded into the camera. It is latched open when the pre-wind operation terminates by a film tension sensing means 142. When the pre-wind operation has ended, the tension in the film causes means 142 to latch open the switch 140 to terminate operation of motor 102 and reverse the connections of reversing switch 114 via lead 144. Such a film tension responsive and motor reversing switch operation system useable in the present invention is shown in German Publication No. 2,151,370.

The various aspects of the operation of a preferred embodiment of the present invention may now be described. When door 42 is opened, the closure of alignment switch 164 will align slot 62 of takeup spool 56 with channel 50 in the manner heretofore described. As shown in FIG. 3, film leader 72 is extended to an appropriate length from cassette 70 in order to enable the insertion of cassette 70 and leader 72 into the film path of camera 10 after such insertion, when door 42 is closed and latched closed by rotation of control knob 38 on the outside of the door, the motor 102 drives takeup spool in a prewind direction where leader 72 is engaged by a takeup spool hook 68 and the film is fully prewound automatically from cassette 70 onto takeup spool 56. When the front end of the leader reaches the end of the prewinding operation, the end of film 74 remains attached to cassette spool 108 within cassette 70 and the tension applied on the film causes termination of the prewind operation.

When camera 10 is thus loaded, the following conditions exist therewithin as shown in FIGS. 7a, 7b, and 7c. Film 74, wound onto takeup spool 56, is interposed between the contact arm 80 and scrubring 78, and thus end-of-film switch 84 is open. Actuating pin 90 is contacted by film 74 proximate imaging area 86 and thus brings switch leg 94 into contact with switch leg 96, closing end-of-rewind switch 98. Film transport switch 132 remains open until shutter release is operated. Thus, FIG. 6 indicates the electrical status of the circuitry of camera 10 after film has been loaded and while no exposures are being made. Motor 102 is thus deenergized as relay 104 is open.

As camera 10 is used, and successive exposures are made by actuating switch 132, film 74 is advanced from takeup spool 56 and is wound back into cassette 70 and onto cassette spool 108.

FIGS. 8a, 8b and 8c illustrate the operating attitude of camera 10 when a sufficient number of exposures has been taken to wind film 74 from takeup spool 56 to enable contact arm 80 to touch scrub ring 78, thus closing end-of-film switch 84. Because film 74 is still in contact with actuating pin 90, end-of-rewind switch 98 remains closed. This completes a circuit through end-of-switch 84 and end-of-rewind switch 98 to energize relay 104 and operate motor 102 until the tension on the film is relieved as the film leader passes by the pressure plate. Motor 102 will then operate continuously until the last picture exposed part of the film 74 is fully wound into cassette 70. As previously indicated, the continuous sound of the motor during final rewinding operation signals to the camera user that the last shot has been taken, and that it is time to reload the camera.

As seen in FIG. 8a, the positioning of contact arm 80 will determine the length of film 74 which will not, as yet, have passed through imaging area 86 during rewind of the film and includes the original film leader which was exposed to light before the cassette was loaded. Said length of film may be characterized as extending from film end B to a point, C, along the film path of camera 10 immediately prior to that portion of said film path which includes imaging area 86. The distance B-C exceeds somewhat the length of leader 72, and so no pre-exposed portion of the film will be held in the imaging area 86 during normal picture taking operations of camera 10. This is accomplished by continuous operation of motor 102 to fully wind the last exposed portion of the film, as depicted in 8a, into cassette 70.

As seen in FIG. 8c, end-of-film switch 84 is actuated prior to the actual end B of film 74 due to that portion of film trimmed away to form tongue 76. Thus, scrub ring 80 and contact arm 78 are preferably positioned at that section of takeup spool 56 around which tongue 76 does not extend. As viewed in FIG. 1, end-of-film switch 84 is positioned at the inboard end of spool 56, as viewed with reference to housing end 20.

It is preferable for end-of-rewind switch 98 to remain closed until all film has exited imaging area 86, and for this reason, actuating pin 90 is positioned where it will contact tongue 76, i.e., at the outboard end of imaging area 86.

Figure 9A:
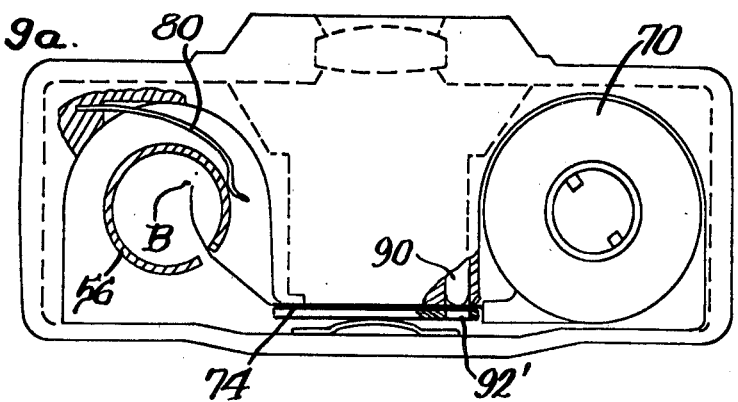
FIG. 9a is a view along line A—A of FIG. 1, showing the camera in an intermediate stage of rewinding.
Figure 9B:
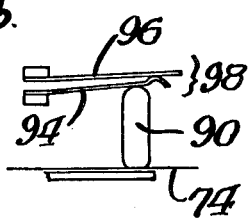
Figure 9C:
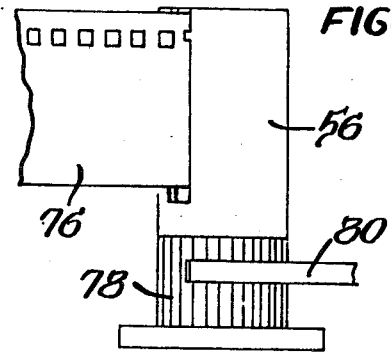

FIGS. 9a, 9b, and 9c show film 74 as it is being completely unwound from takeup spool 56. At this instant, motor 102 is still operating continuously to advance film 74 into cassette 70. As seen in FIGS. 9b and 9c, end-of-film switch 84 and end-of-rewind switch 98 remain closed.

FIGS. 10a, 10b, and 10c illustrate camera 10 at the completion of the film rewind sequence. End-of-film switch 84 remains closed, however, end-of-rewind switch 98 has opened responsive to the absence of film 74 in imaging area 86. When end-of-rewind switch 98 opens, relay 104 is deenergized and motor 102 ceases to operate. Camera 10 is now ready to be unloaded and reloaded with a fresh film cassette.

It should be noted that the foregoing description of the operation of camera 10 is not dependent upon use of motor 102 to prewind film 74 onto takeup spool 56. Other camera configurations may be provided to enable such winding to be carried out manually, when and if desired.

Means may also be provided to disable shutter release 30 when no film 74 is present in the imaging area, to prevent the shutter from being actuated after final rewind of leader 72 into cassette 70.

The foregoing has set forth preferred embodiments of the present invention. Such embodiments are exemplary only and the present invention is capable of expression in other embodiments as well.

Figure 11:
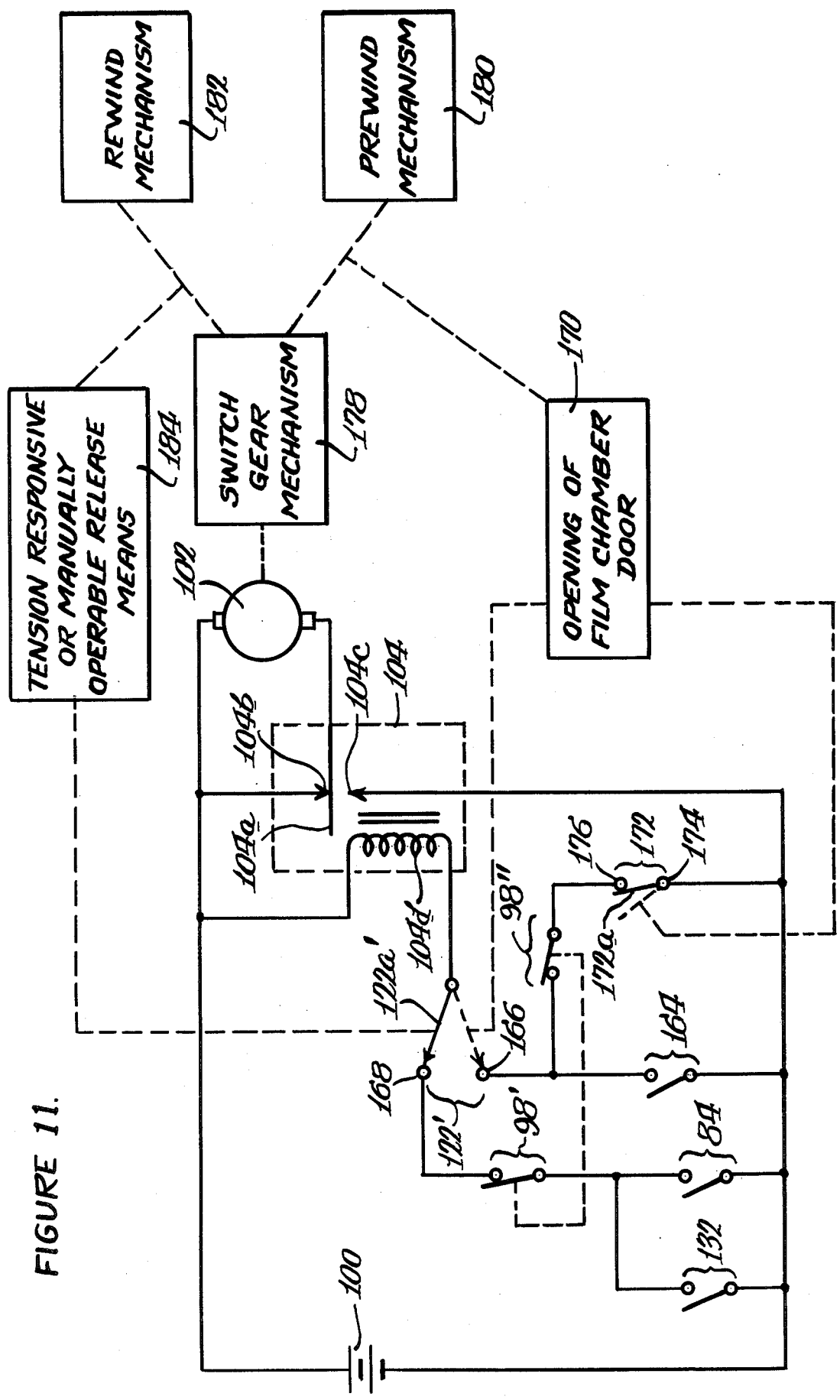
FIG. 11 is a schematic drawing of a second preferred motor actuation circuit with the camera loaded with film and ready to make an exposure.

One such other embodiment is shown in FIG. 11. As with the prior described embodiment, transport motor 102 operates in a first, or prewind mode, to prewind film onto takeup spool 56, and in a second, or transport mode, to advance successive unexposed film frames into imaging area 86 and, therefrom, into film cassette 70.

As seen in FIG. 11, a mode switch 122' which replaces door switch 122 previously described, is directly, or through its connection to another latchable member, latchable into a prewind or reverse film transport mode. It is shown as a single-pole two-position switch normally latched to the position illustrated by the dashed lines, where movable pole 122a' thereof is in contact with a stationary contact 166 in the prewind mode. When pole 122a is in the position shown by the solid lines of FIG. 11, and is touching contact 168, it is in the reverse film transport mode, that is, the mode during which film is advanced one frame at a time to position an unexposed frame in the cameras imaging area and, subsequently, to wind exposed frames of film into cassette 70.

Movement of mode switch 122 from the reverse film transport mode to the prewind mode is preferrably effected by the opening of film chamber door 42 as shown schematically by function block 170 of FIG. 11, and by the dashed lines showing the position of pole 122a.

A film chamber door switch 172 is provided and illustrated as a single throw switch having a pole 172a which, when film chamber door 42 is open, assumes the position shown by the dashed lines in FIG. 11 and which, when film chamber door 42 is closed, is in the position shown by the solid lines in FIG. 11.

Means may also be provided to prevent the energizing of motor 102 in the prewind mode unless film has been loaded into camera 10. A loaded/unloaded switch 98″ may be formed as a separately operating switch as part of the structure of end-of-film switch 98′, that is, as an electrically separate single-pole switch in series with switch 172 and operated by actuating pin 90. Unless film is present in imaging area 86, motor 102 cannot be energized, either in the rewind mode or the prewind mode. When film is loaded, and chamber door 42 is closed, film chamber door switch 172 is closed, completing an electrically conductive path between contacts 174 and 176 and coupling power through loaded/unloaded switch 98″ and thereby to relay 104. Thus, when mode switch 122 is in the prewind mode, that is, when pole 122a touches contact 166, and, when film chamber door 42 is closed, thereby closing film chamber door switch 172, and film is loaded, closing loaded/unloaded switch 98‴, relay 104 is energized to operate transport motor 102 in the prewind mode where the film is prewound onto takeup spool 56 until the film is fully wound thereon.

Because, as previously described, transport motor 102 is used to transport the film both in the prewind and in the reverse film transport modes, means must be provided to enable such dual use. In the embodiment illustrated in FIG. 11, a switch gear mechanism 178 is provided which may include a latchable support platform carrying the motor 102 and a drive gear. The platform is selectively movable between a position where the drive gear is coupled to a takeup spool connected prewind gear mechanism 180 and a position where the drive gear is coupled to a cassette drive coupling, or rewind mechanism 182. As shown in FIG. 11, switch gear mechanism 178 is moved and latched into engagement with prewind mechanism 180 by the opening of film chamber door 42. In like fashion, switch gear mechanism 178 is moved and latched into engagement with rewind mechanism 182 when prewind is complete by a film tension responsive or manually operable release means shown symbolically at block 184.

Such operation of tension responsive or manually operable release means 184 not only causes switch gear mechanism 178 to operate rewind mechanism 182, but it also moves mode switch 122 into the reverse film transport mode position shown in solid lines.

When mode switch 122 is in the reverse film transport mode shown by the solid line position of pole 122a′, slot position switch 164 and film chamber door switch 172 are operably de-coupled from the relay coil circuit, and end-of-rewind switch 98, end-of-film switch 84, and film transport switch 132 are coupled thereto and function similarly to that hereinbefore described; although the circuit connections are somewhat different. Thus, film transport switch is in parallel with takeup spool carrying end-of-film switch 84 and in series with end-of-rewind switch so that once the film has been rewound into the film cassette, switch 98′ opens so that depression of the shutter release cannot then energize the motor 102.

While the foregoing has described various specific aspects of the present invention, such description has been by way of example only, and is not intended to limit the spirit and scope of the invention as herein discussed. It is expected that others will perceive variations which, while differing from the foregoing, do not depart from the spirit and scope of the invention as described and claimed.

We claim:

1. A still camera including a housing having a film chamber for receiving a film cassette with a film leader extending therefrom, said chamber defining a film path including a supply cavity for receiving said cassette, said supply cavity being at one end of said film path, a takeup cavity housing a takeup spool at the other end of said film path, an imaging area adjacent one side of said film path, an object lens, a shutter mechanism directing light from said object lens to said imaging area when operated, a door closing off said film chamber, means for prewinding the film in said film cassette onto said takeup spool after said cassette is inserted into said supply cavity and said film chamber door is closed, means for unwinding one frame length of said film from said takeup spool after each picture taking operation to position successive unexposed segments of said film at said imaging area, and means for rewinding the exposed segments of said film into said cassette, a film transport motor, and means responsive to an end-of-film condition, for automatically rewinding at least the last exposed portion of said film ahead of said leader into said cassette by actuating said motor and for alerting the user that such an end-of-film condition has occurred.

2. The camera of claim 1 wherein said automatic rewinding means causes a relatively long period of motor energization when said end-of-film condition is reached to rewind the previously exposed segment of said film involved, and at least part of said film leader, into said cassette.

3. The camera of claim 2 wherein said period of energization when said motor responds to said end-of-film condition is a period of energization much more than the motor is energized to advance said film one frame length, the energization of said motor being audible so the user is alerted that such end-of-film condition exits when the prolonged period of motor energization is heard.

4. The still camera as described in claim 1 wherein said automatic rewinding means includes an end-of-film switch which is closed when the end-of-film condition has been reached and an end-of-rewind switch having control means in the path of film movement which is closed by said control means when tension is still maintained in said film moving in said path.

5. The still camera of claim 3 wherein said control means is located on the side of said imaging area adjacent the supply cavity.

6. The camera of claim 1 wherein said means for prewinding said film in said film cassette onto said takeup spool after said cassette is inserted into the supply cavity said film chamber door is closed includes said film transport motor.

7. The still camera of claim 6 wherein said motor also forms part of said means for unwinding said one frame length of said film from said takeup spool after each picture-taking operation, said motor being coupled to a spool of said film cassette during a rewind operation and being coupled to said takeup spool during a prewinding operation.

8. The still camera as described in claim 3 wherein said end-of-film switch includes a contact plate extending about the outer periphery of said takeup spool, and a contact arm attached at one end to said camera and biased to press the other end thereof into continuous contact with said contact plate, said contact arm and said contact plate positioned to be separated by said film as said film is wound onto said takeup spool.

9. The still camera as described in claim 1 wherein said end-of-rewind switch includes an actuating pin projecting into the path of movement of said film.

10. The still camera as described in claim 9 wherein said actuating pin is positioned at said imaging area proximate to said supply cavity.

* * * * *